(12) United States Patent
Huang et al.

(10) Patent No.: US 9,812,978 B2
(45) Date of Patent: Nov. 7, 2017

(54) CIRCUIT AND METHOD FOR DRIVING SYNCHRONOUS RECTIFIERS FOR HIGH-FREQUENCY FLYBACK CONVERTERS

(71) Applicant: Virginia Tech Intellectual Properties, Inc., Blacksburg, VA (US)

(72) Inventors: Xiucheng Huang, Blacksburg, VA (US); Fred C. Lee, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/085,012

(22) Filed: Mar. 30, 2016

(65) Prior Publication Data

US 2016/0294292 A1  Oct. 6, 2016

Related U.S. Application Data

(60) Provisional application No. 62/142,078, filed on Apr. 2, 2015.

(51) Int. Cl.
*H02M 3/335* (2006.01)
*H02M 1/44* (2007.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 1/44* (2013.01); *H02M 2001/0048* (2013.01); *Y02B 70/1475* (2013.01)

(58) Field of Classification Search
CPC . H02M 2001/0048; H02M 2001/0054; H02M 1/08; H02M 1/44; H02M 3/33553; H02M 3/33592; Y02B 70/1475
See application file for complete search history.

(56) References Cited

U.S. PATENT DOCUMENTS

| | | | |
|---|---|---|---|
| 5,982,160 A | 11/1999 | Walters et al. | |
| 6,414,469 B1 | 7/2002 | Zhou et al. | |
| 2007/0103946 A1* | 5/2007 | Kyono | H02M 3/33592 363/21.14 |
| 2008/0285312 A1* | 11/2008 | Fu | H02M 1/08 363/21.06 |

(Continued)

*Primary Examiner* — Fred E Finch, III
(74) *Attorney, Agent, or Firm* — Whitham, Curtis & Cook, P.C.

(57) ABSTRACT

A voltage waveform similar to a waveform of a magnetizing current of an isolation transformer and immune to high frequency oscillatory resonant behavior is developed across a capacitor of a series resistor and capacitor connection connected in parallel with a synchronous rectifier. A simple logic circuit produces a waveform for controlling the synchronous rectifier which is not subject to significant turn on delay or early turn off caused by oscillatory resonances among parasitic inductances and capacitances. Improved timing accuracy of a synchronous converter provides improved power converter accuracy, particularly for flyback converters which are commonly used in converters for supplying power to offline electrical devices but are subject to oscillatory resonant behaviors that cannot be adequately damped at switching frequencies sufficiently high to support miniaturization of adapters.

16 Claims, 10 Drawing Sheets

(56) References Cited

U.S. PATENT DOCUMENTS

| | | | |
|---|---|---|---|
| 2012/0033460 A1* | 2/2012 | Yeh | H02M 1/083 363/21.18 |
| 2012/0063175 A1* | 3/2012 | Wang | H02M 3/33592 363/21.14 |
| 2013/0279207 A1* | 10/2013 | Yu | H02M 3/33507 363/21.06 |
| 2016/0126845 A1* | 5/2016 | Cohen | H02M 3/33507 363/21.01 |
| 2016/0211757 A1* | 7/2016 | Braz | H01L 29/407 |

* cited by examiner

*Figure 1A*

High density adapter

*Figure 1B*

> 80% loss reduction w/ SR

Severe oscillation of $I_{SR}$ at high frequency

$\Delta V_{CS} = \Delta I_L \times R_L$ If $R_{CS} \times C_{CS} = \dfrac{L}{R_L}$

CIRCUIT AND METHOD FOR DRIVING SYNCHRONOUS RECTIFIERS FOR HIGH-FREQUENCY FLYBACK CONVERTERS

CROSS-REFERENCE TO RELATED APPLICATIONS

This application claims benefit of priority of U.S. Provisional Patent Application 62/142,078, filed Apr. 2, 2015, which is hereby incorporated by reference in its entirety.

FIELD OF THE INVENTION

The present invention generally relates to direct current power supplies and, more particularly, to driving synchronous rectifiers for flyback power converters.

BACKGROUND OF THE INVENTION

Much of the electrical power in use worldwide is distributed as high voltage alternating current (AC) from the location at which it is generated to a location proximate to where is will be utilized. High voltage allows power transmission over long distance with reduced wiring cost and resistive losses. Voltage can then be reduced, usually in stages, to lower voltage suitable for intended loads. This power distribution system is often referred to as the "power grid" or, simply, "grid".

However, most electrical and electronic devices operate as a substantially fixed voltage, referred to as direct current (DC) and are often arranged to be temporarily connected to the grid or disconnected therefrom during which time they are operated from batteries that may be recharged from the power distributed on the grid. Accordingly, such devices, referred to as "offline", require power conversion from AC to DC power and often the DC power is regulated at a much lower voltage than the voltage available from a connection to the grid. (More specifically, "offline power supply" is defined as a power supply in which the line voltage is rectified and filtered without using a line frequency isolation transformer, which does not preclude inclusion of a high frequency isolation transformer.) Devices that perform such conversion and possibly voltage regulation are often referred to as "adapters" and may be integrated with the electrical device for which they supply power or constructed as a separate structure with wires and fixtures for connection to both the grid and the electrical device.

So-called flyback converters (essentially a buck-boost topology DC—DC converter including a transformer for isolation and so-called because the energy transferred to the secondary side of the transformer is reflected back to the primary side when the primary side is "off" or non-conducting) are widely used in offline applications. After rectification to obtain a DC voltage input power source and switching to obtain a chopped DC waveform for input to the transformer, a passive diode is a simple expedient for providing DC conversion on the secondary side of the transformer but suffers from high conduction losses due to both a forward voltage drop and resistive losses at significant conduction current. Such conduction losses can be greatly reduced by using a synchronous rectifier that is essentially a switch that is controlled to conduct during selected periods when voltage is available to be conducted as DC. For example, a power MOSFET rated for 100 volt operation is considered to be a good choice for such applications and can reduce conduction losses by about 80% compared with a diode.

However, some difficulties are presented in precisely controlling devices which are practical for synchronous rectifier (SR) applications, particularly in adapters such as those described above. In such adapters light weight and low volume are particularly desirable since the devices to which they supply power are also small and typically of relatively light weight to be conveniently portable or movable. Accordingly, it is desirable to operate the adapter at high frequency to minimize the required sizes of components therein such as the transformer and filter capacitors and required power factor correction (PFC) and electromagnetic interference (EMI) filters. Unfortunately, the parasitic inductance including leakage inductance of the transformer, printed circuit board (PCB) layout and the primary and secondary switches package parasitic inductance resonates with parasitic capacitance of the primary side switch when the primary side switch is off and while the oscillation can be damped relatively quickly, it cannot be damped in the short off-period at a suitably high frequency to provide for reduction of component size, typically about 1 MHZ. This same oscillation exists in the secondary side SR circuit and makes SR driving difficult; the oscillation often shortening the SR conduction period and compromising a large part of the loss reduction potentially derived from the use of an SR.

SUMMARY OF THE INVENTION

It is therefore an object of the present invention to provide a circuit for preventing oscillation in a flyback power converter from interfering with a method of determining switching instants of a synchronous rectifier therein that is operated at high frequency.

It is another object of the present invention to provide a method, technique and circuit for operating a synchronous rectifier in a flyback power converter at a sufficiently high frequency to significantly reduce size of components in an adapter and increase power density significantly beyond power densities that have been achieved prior to the invention.

It is a further object of the invention to significantly decrease the severity of the existing and recognized design trade-off between power density and efficiency in adapters for offline electrical devices.

In order to accomplish these and other objects of the invention, a transformer isolated power converter is provided comprising a transformer, a synchronous rectifier connected in series with a secondary winding of the transformer, a series connected resistance and capacitance connected in parallel with the synchronous rectifier, and a circuit responsive to a voltage developed across the capacitor for developing a signal to control the synchronous rectifier.

In accordance with another aspect of the invention, an adapter is provided for providing power from an AC power source to an offline electrical device at a DC voltage, the adapter comprising, an isolation transformer having primary and secondary windings and operated at a frequency different from the AC power source, a synchronous rectifier in series with the secondary winding of the isolation transformer, a series connection including a resistor and a capacitor connected in parallel with the synchronous rectifier, and a circuit responsive to a voltage developed across the capacitor for controlling the synchronous rectifier.

In accordance with a further aspect of the invention, a method of driving a synchronous rectifier in a flyback power converter including an isolation transformer comprising steps of controlling current in a primary winding of the isolation transformer, developing a signal having a waveform similar in shape to a magnetizing inductance current of the isolation transformer, and generating aa control signal near a minimum of the signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
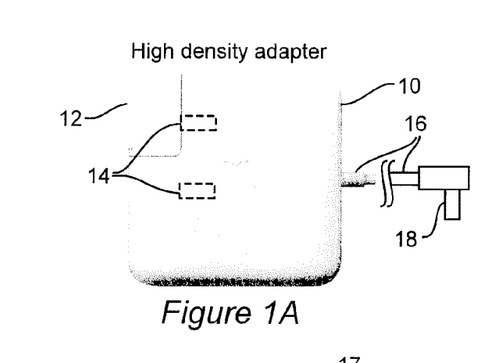
FIG. 1A illustrates the basic appearance of a commercially available adapter.

Referring now to the drawings, and more particularly to FIG. 1, there is shown an exemplary commercially available adapter for use with a separate offline electrical device. The adapter is constructed and housed within a preferably compact and generally rectangular housing 10 and preferably includes, in this case, a folding plug 12 for connection to a power receptacle and an indicator (not shown) to confirm when it is receiving power. Alternatively, connector blades 14 (shown by dashed lines) may be provided on the back side of the adapter case or an adapter cable for plugging into a standard receptacle connected to the grid and supplying a voltage over cable 16 to connector 18 which is preferably configured to limit the possibility of shorting the adapter output. The configuration shown is not at all critical to the operation or use of the adapter but light weight and small size are generally preferable.

Figure 1B:
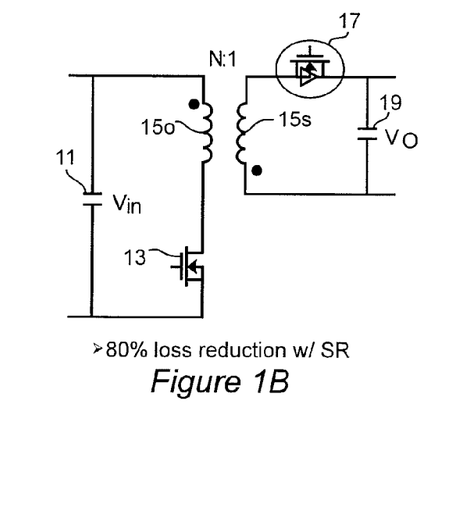
FIG. 1B schematically illustrates the basic architecture of a flyback converter.

A highly simplified schematic diagram of a flyback converter is illustrated in FIG. 1B. Adapter 10 will include a rectifier circuit (not shown) to provide DC power input to an input capacitor $V_{in}$ 11. a series connection of a primary side switch 13 and transformer primary winding 15p are connected across the input capacitor 11. the switch serves to periodically provide and interrupt current that flows through the transformer primary winding to generate a periodic magnetic field coupled to the transformer secondary winding and induces a reduced periodic voltage thereon which is rectified by a diode or synchronous rectifier (SR) 17 to produce a DC voltage which charges output capacitor 19 and supplies power at voltage Vo to a load.

Figure 1C:
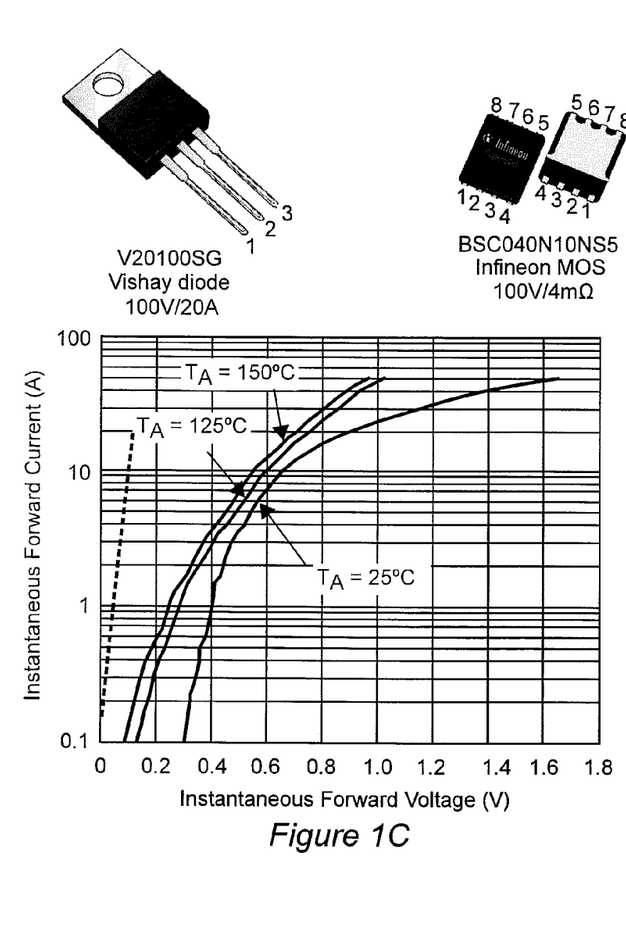
FIG. 1C is a graphical comparison of the conduction characteristics of diodes and MOSFET synchronous rectifiers (Srs)

As alluded to above, a diode is a simple and inexpensive device that can be used for rectifier 17 but exhibits significant conduction losses as shown in FIG. 1C. Curved lines illustrate the typical variation in instantaneous forward current with instantaneous forward voltage for diodes at various exemplary temperatures. The curvature is indicative of significant increasing resistance with forward voltage and current. It can also be observed that a small but significant forward bias is required to induce conduction in a diode. In sharp contrast therewith, the typical conduction characteristic for a MOSFET synchronous rectifier (SR) is shown by a dashed line which is highly linear and steeply sloped, indicating a substantially constant and very low resistance over a substantial current range. Therefore, as alluded to above, use of a SR in an adapter using a flyback converter can reduce conduction losses by about 80% (the approximate ratio of resistances of the two types of rectifier device at moderate currents but increasing almost exponentially for diodes at increasing currents).

Figure 2A:
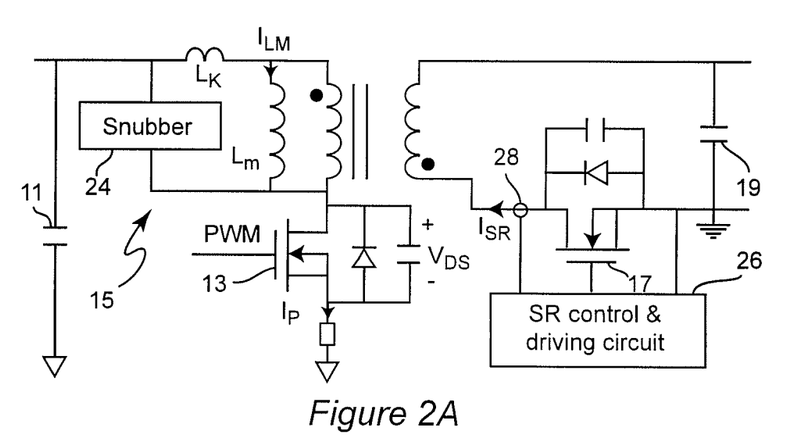
FIG. 2A is a generalized schematic illustration of a practical circuit for a flyback converter.
Figure 2B:
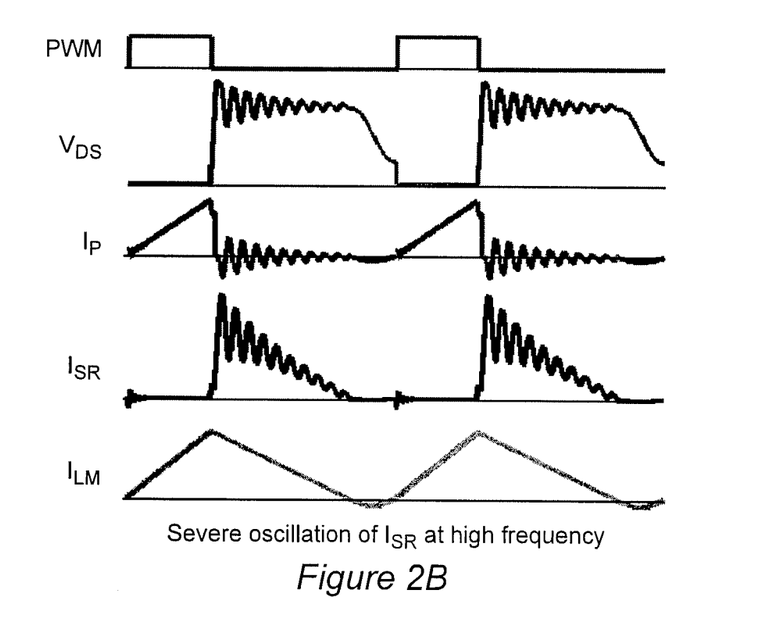
FIG. 2B illustrates oscillatory waveforms in the circuit of FIG. 2A.

FIG. 2A schematically illustrates a practical flyback converter in somewhat greater detail and FIG. 2B illustrates operational waveforms at indicated locations therein. The important parasitic portions of transformer 15 and switches 13 and 17 are illustrated. Specifically the leakage and magnetizing inductances of transformer 15 are illustrated on the primary side and the parasitic diode and capacitance of the switches are included. The snubber circuit also includes a capacitor, usually in a RCD clamp circuit, and exhibits additional parasitic capacitance. As alluded to above, the step transients of the pulse width modulated signal, PWM, causes resonance between the magnetizing inductance and the parasitic (and physical) capacitances of the switches (and snubber circuit) causing oscillatory currents and voltages as shown in FIG. 2B which are damped by snubber 24. An SR control and driving circuit 26 and voltage/current sensor 28 providing an input thereto are also shown on the secondary side of FIG. 2A. To achieve the full potential of reducing conduction losses SR 17 must be very accurately driven to be conductive for the correct period when a voltage is being induced on the transformer secondary.

Known techniques for driving an SR are all targeted at low frequency operation well below 500 kHz. One technique is a current sensing based method which senses SR current to determine switching points but is not preferred since an additional current sensing transformer would increase adapter size, increase inductance and aggravate the oscillation. Additionally, current sensing is susceptible to delayed turn on and early turn off of the SR which reduces at low frequencies but is aggravated at increased frequencies, tending to compromise efficiency. The second compares the voltage across the SR with preset threshold voltages to determine switching instants that is usually performed by an integrated circuit, several of which are commercially available but not capable of operation at high frequencies. This latter technique is particularly susceptible to errors and foreshortening of SR conduction periods due to oscillation although it works quite well at lower frequencies allowing time for the damping of the oscillations. Therefore, it is clearly seen that there is a trade-off between adapter size and power density and efficiency of AC to DC conversion.

Figure 3A:
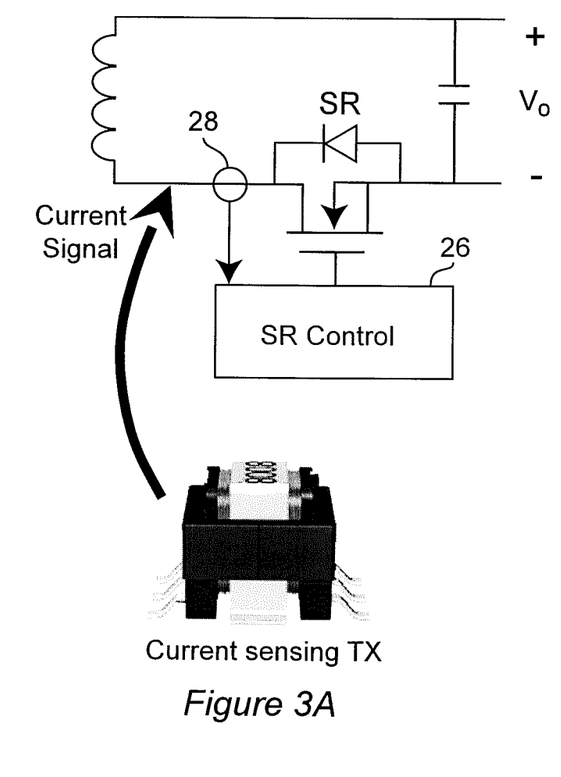
FIG. 3A illustrates a known current-sensing technique for driving an SR, FIG. 3B schematically illustrates an implementation of current-based sensing.
Figure 3B:
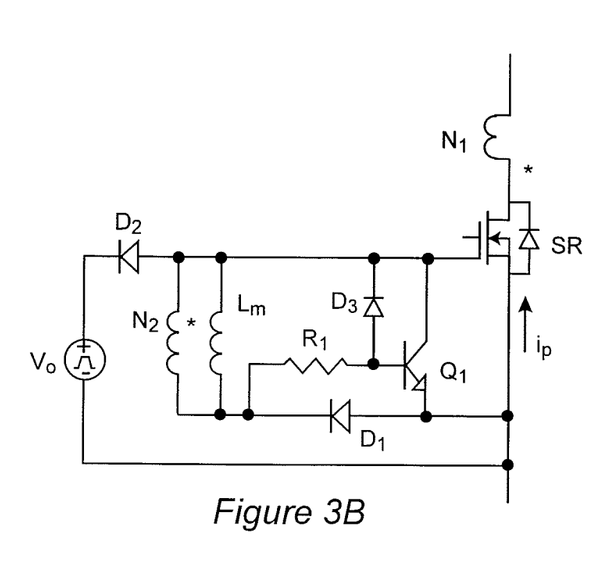

Referring now to FIGS. 3A and 3B a current sensing based SR driving method is illustrated. In this case, sensor 28 is a current sensing transformer which is bulky and increases the secondary side loop inductance which further aggravates the oscillatory behavior of the flyback circuit as can be seen at N1 and N2 of FIG. 3B. As can be seen from FIG. 3B the circuit associated with the current sensing transformer is essentially a zero-crossing detector for the magnetizing current of the transformer which is illustrated in FIG. 3B as reflected to the secondary side of the flyback converter. As shown in FIG. 2B, the oscillatory voltages and currents do not appear on the magnetizing inductance but a bias current may be present that may cause delayed turn-on and early turn-off of the SR. Therefore, current based SR control is susceptible to inaccurate performance and does not deliver the potential reduction in conduction losses.

Figure 4:
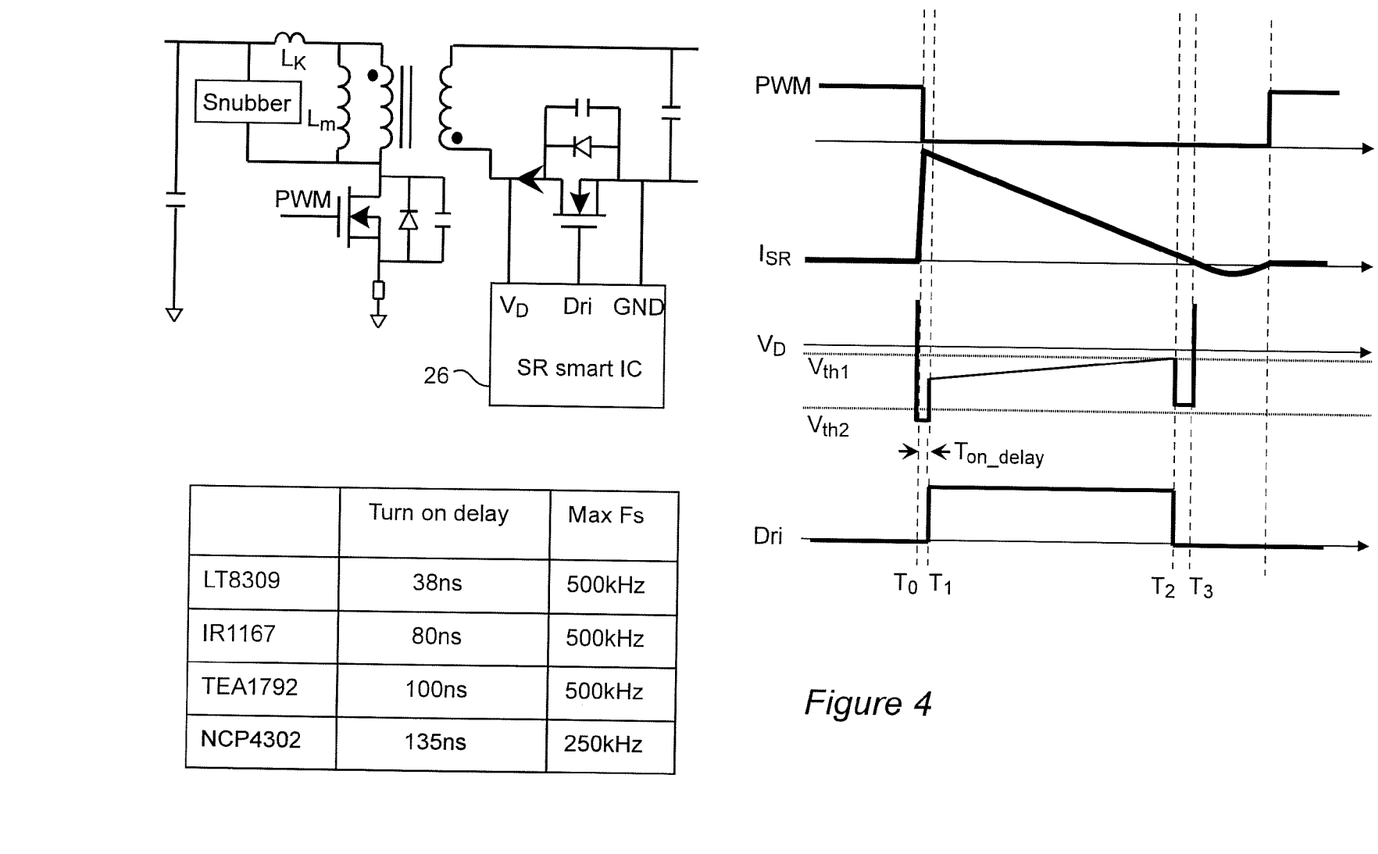
FIG. 4 illustrates a known voltage-sensing technique for driving an SR.

Referring now to FIG. 4, a voltage sensing based SR driving method will now be discussed. It will be noted from a comparison with FIG. 3A that sensor 28 is simply an ohmic connection to one terminal of the SR and the SR controller is a "smart integrated circuit" processor that compares the voltage $V_D$ to two predetermined thresholds. It will also be noted from the operational waveforms of FIG. 4 that there will be an inherent turn-on delay due to the processing latency and signal propagation time. The time between $T_2$ and $T_3$ can be considered dead time to avoid the SR conducting reverse current (except for ringing after $T_3$). $V_{th1}$ is usually quite small and on the order of a few millivolts. Therefore, the dead time is very short. Commercially available ICs for this purpose are targeted at switching frequencies of 500 kHz or lower and are not capable of operating at higher frequencies. Therefore, at the present state of the art, voltage sensing based SR control does not support reduction of component size and increase power density of adapters.

Figure 5:
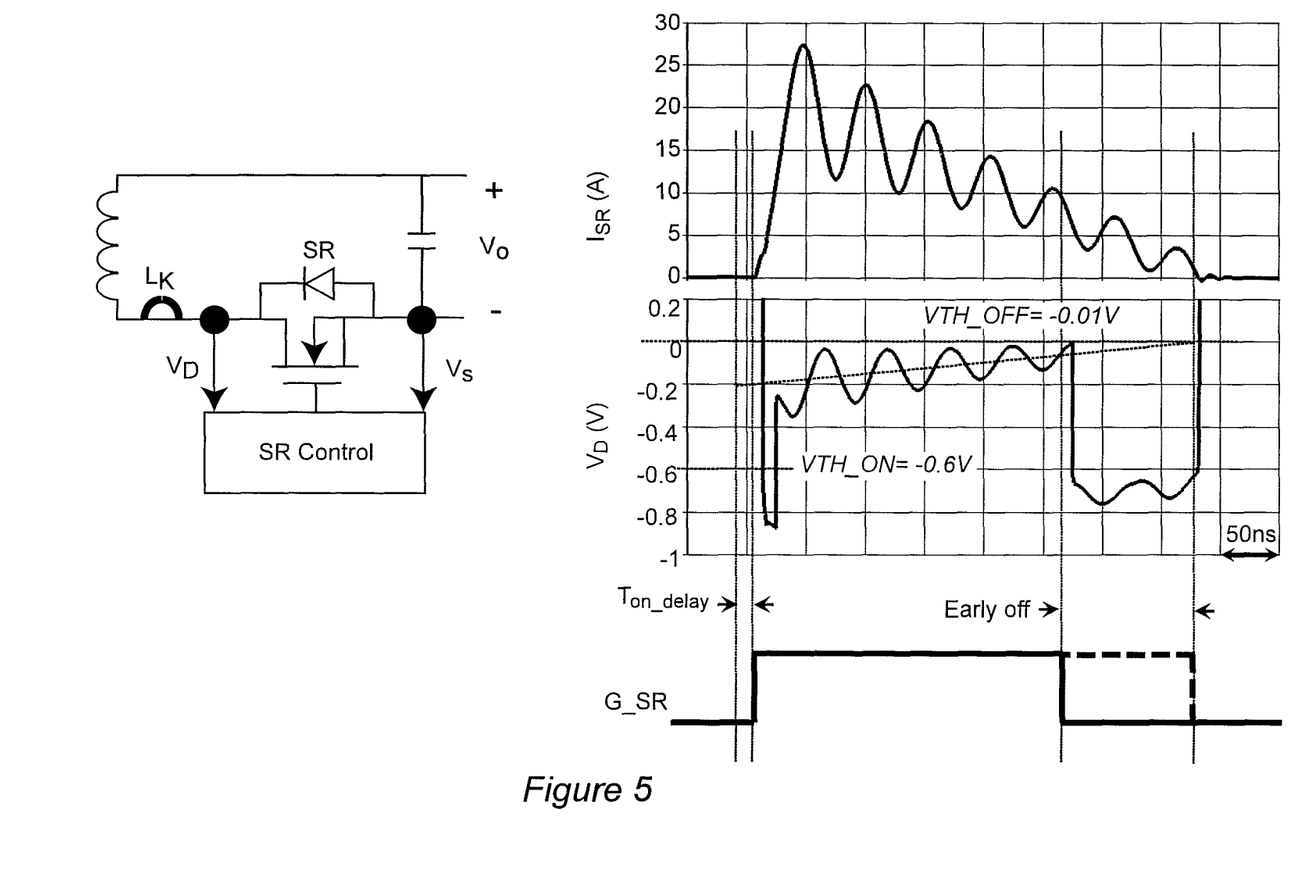
FIG. 5 illustrates problems with voltage sensing for SR driving.

Further, since oscillatory behavior of flyback converters is highly dependent on the packaging layout and leakage inductance of the transformer 15, the oscillatory behavior is difficult to predict, filter or compensate and may cause further errors in SR control as shown in FIG. 5. Specifically, as the oscillatory behavior is damped. oscillation in $V_d$, sensed at an SR terminal may reach an instantaneous value of zero prior to the current reaching zero and an early turn-off of the SR will be caused.

Figure 6:
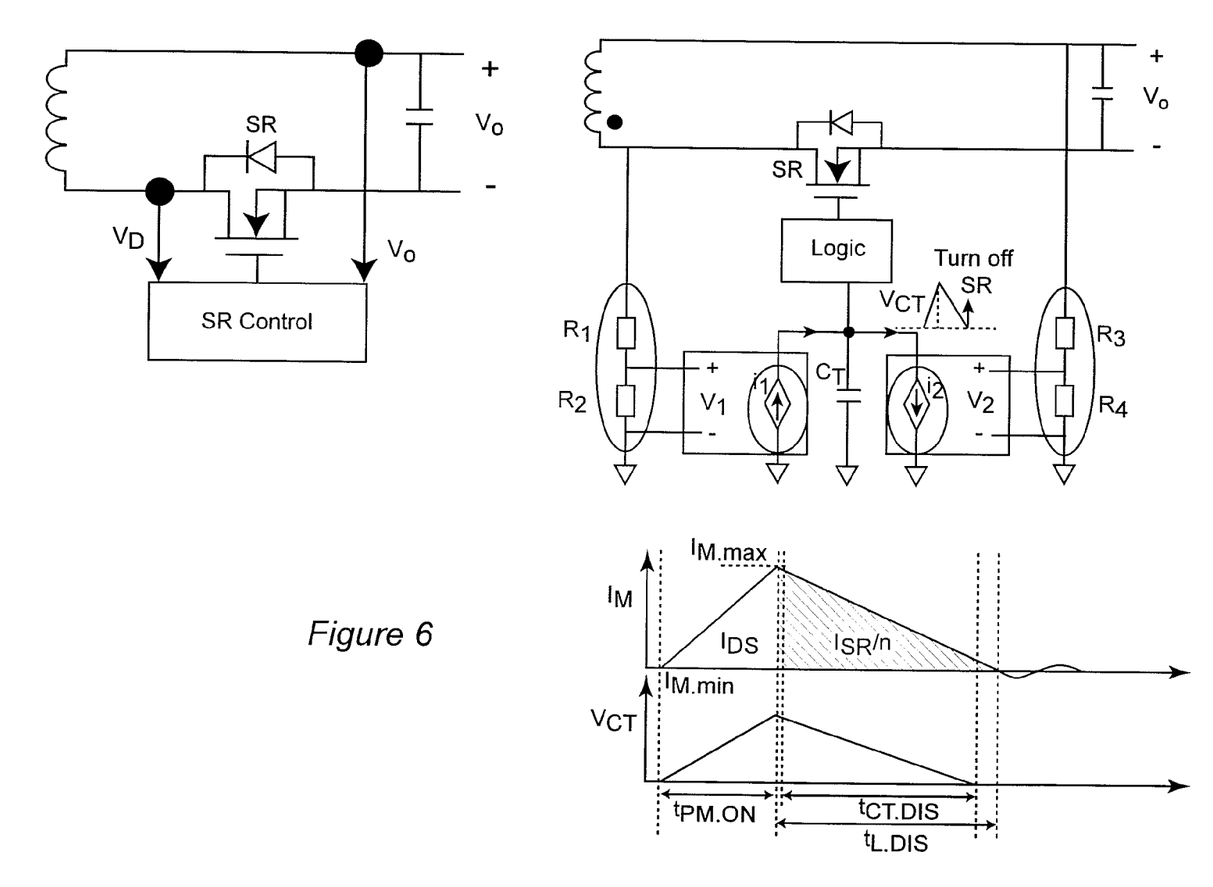
FIG. 6 illustrates a voltage balance based technique for SR driving.

A variant form of voltage-based SR control is illustrated in FIG. 6 and is referred to as voltage balance based SR driving which eliminates the impact of the high frequency ringing of the oscillatory behavior. The basic concept is to use current sources related to the input and output voltages through voltage dividers to charge and discharge a capacitor in such a way that the voltage developed on the capacitor emulates the magnetizing current of the transformer. This concept has been embodied in commercially available integrated circuits used for SR control but such circuits are expensive and increase adapter cost. Moreover, this technique and circuit is very sensitive to variation of the parameters of the voltage dividers and the voltage controlled current sources and is thus susceptible to inaccurate SR control.

Figure 7:
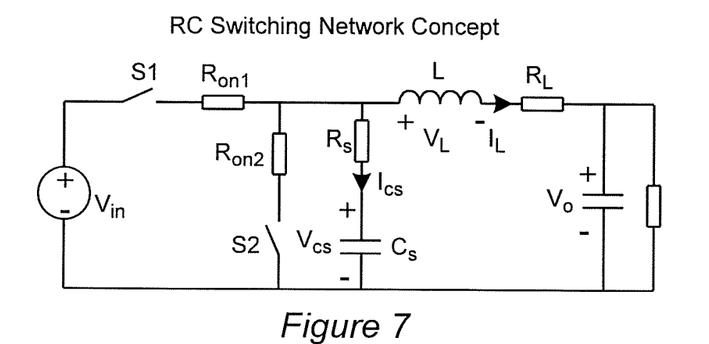
FIGS. 7 and 8 illustrate aan RC switching network concept for measuring inductor current, FIG. 9A schematically illustrates a flyback
Figure 8:
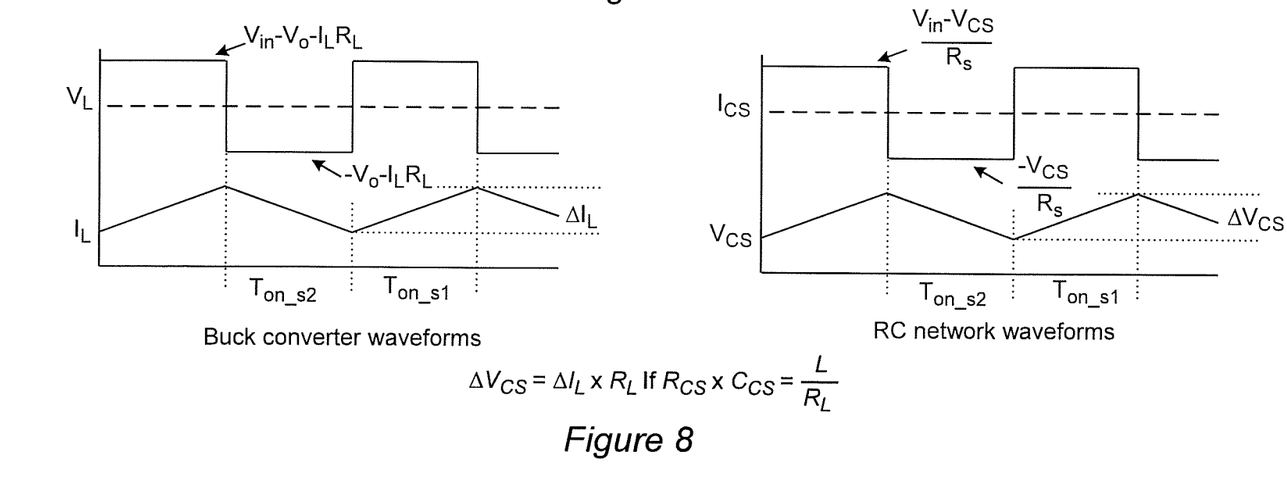

For control of power converters in general, it is often useful to measure inductor current although providing an inductively coupled current sensor or additional transformer consumes space and adds weight which are undesirable in a power adapter for small electronic devices and may cause alteration of electrical characteristics of the power converter as alluded to above in connection with current based SR control. Another technique of measuring inductor current is disclosed in U.S. Pat. Nos. 5,982,160 and 6.414,469 which are hereby fully incorporated by reference. This technique is essentially the inductor current counterpart of a so-called lossless capacitor current sensor that provides a branch circuit having a time constant well-matched to the time constant of the inductor in combination with its equivalent series resistance such that a voltage appearing on a component of the branch circuit equals or is proportional to the current sought to be measured. That is, referring to the circuit illustrated in FIG. 7 and the waveforms of FIG. 8, $$\Delta V_{cs} = \Delta I_L * R_L, \text{ if } R_{cs} * C_{cs} = L/R_L.$$

This technique is widely used for current measurements in voltage regulator applications but has not previously been used in power adapters. Even though it does not cause some of the problems associated with inductive current measurements and affords some potential for reduction of total component volume and weight, it presents its own set of problems of predictability and stability of inductor parameters and close matching of time constants.

Figure 9A:
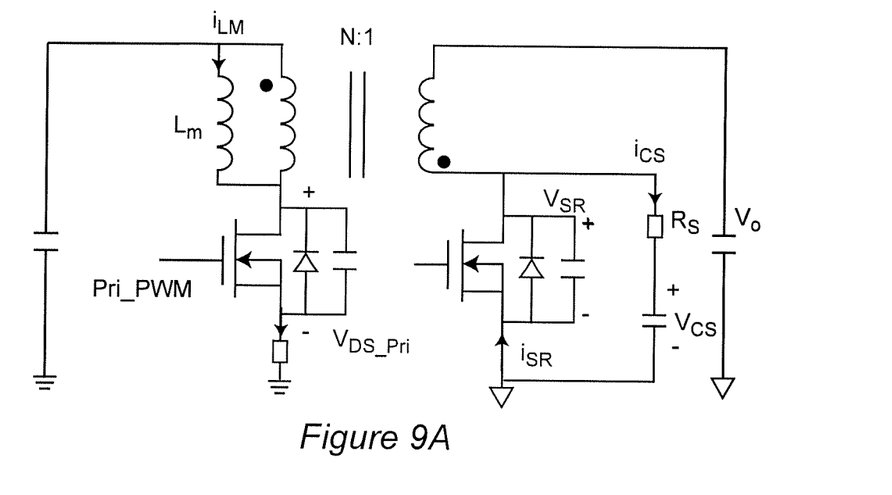
Figure 9B:
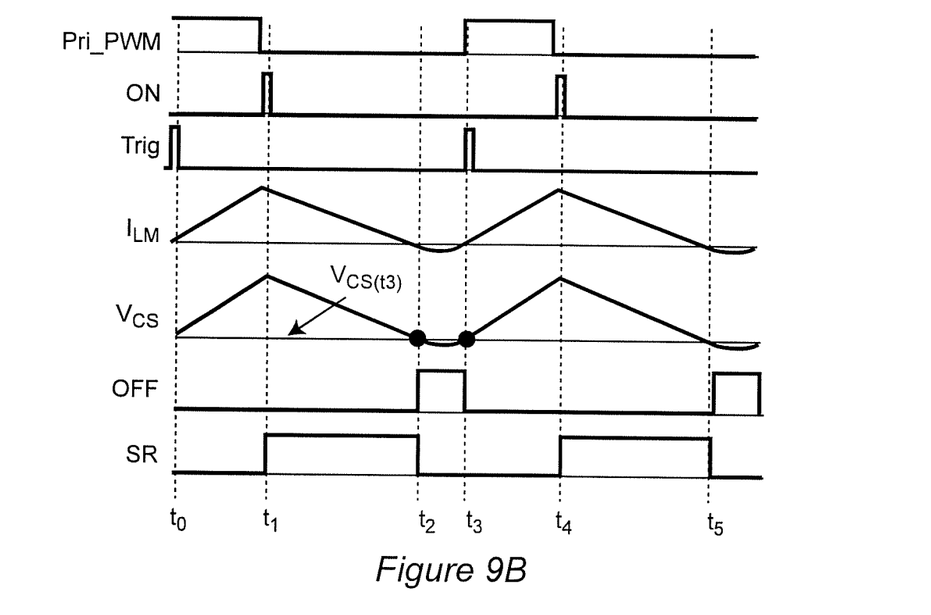
FIG. 9B illustrates voltage and current waveforms at selected locations in the circuit of FIG. 9A, FIG. 10 schematically illustrates an exemplary logic circuit implementation of the invention for developing an SR control signal.
Figure 10:
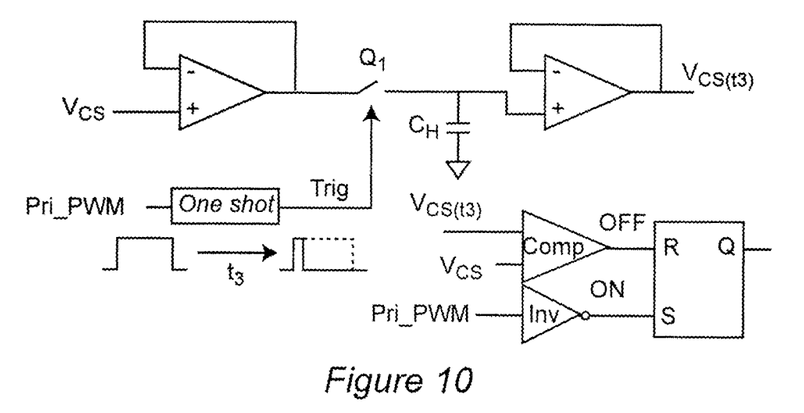

However, for purposes of the present invention where the waveform of the magnetizing current (as distinct from inductor current) is of interest and actual current measurement is substantially irrelevant to the determination of SR switching points, the inventors have found that an RC branch circuit placed in series with the transformer secondary and in parallel with the SR as shown in FIG. 9A will provide a waveform identical in shape and phase (although usually differing in magnitude) from the inductor current and in which no ringing or oscillatory behavior is observed. This immunity from ringing can be readily understood since the waveform is of the voltage across the capacitor which passes the very high ringing frequencies and the voltage variation of the ringing will appear only as a voltage drop across resistor $R_S$. Further, since the amplitude of $V_{CS}$ is irrelevant to the invention, it is not necessary that the time constant of the branch circuit be closely matched to the time constant of the inductor and thus this arrangement does not present the problems that are observed when a similar arrangement is used for inductor current measurement. The similarity of the waveform of $V_{CS}$ to that of the magnetizing current, $I_{LM}$, and the absence of ringing is evident in the waveforms of FIG. 9B. Using a waveform that mimics the shape of the magnetizing current allows a very simple and straightforward logic implementation for the SR driver of a flyback converter as shown in FIG. 10.

Functionally, $V_{CS}$ is amplified and gated to provide a short delay, $t_3$, using a one-shot circuit, following the trailing edge of the primary side PWM signal which is inverted and used to set a latch. The signal developed from the PWM signal and the one-shot is sampled and held (e.g. using $C_H$) to develop a $V_{CS}(t_3)$ signal. The $V_{CS}$ and $V_{CS}(t_3)$ are compared and the latch reset when they differ, thus producing a dead time between $t_2$ and $t_3$ prior to the next PWM pulse. Therefore it is clearly seen that the SR control signal can be developed from a simple logic circuit which is easily implemented and the dead time can be easily adjusted by adjustment of the signal developed by the one-shot circuit. More specifically, as illustrated in FIG. 10, the primary PWM signal generates a small signal at $t_3$, referred to as a trigger signal (Trig), and then Q1 is turned on and $V_{CS}$ is sensed and stored in $C_H$. This process is similar to a sample and hold function but differs in that the sensed information is used in the same switching cycle. The value can be approximately $V_{CS}(t_3)$ since the pulse width of the trigger signal is quite small. Comparison of instantaneous $V_{CS}$ with $V_{CS}(t_3)$ can provide the turn off signal for the SR at $t_5$. The turn on signal for SR can be easily derived from the inverse of the primary PWM signal at $t_4$ with a short dead time.

Figure 11:
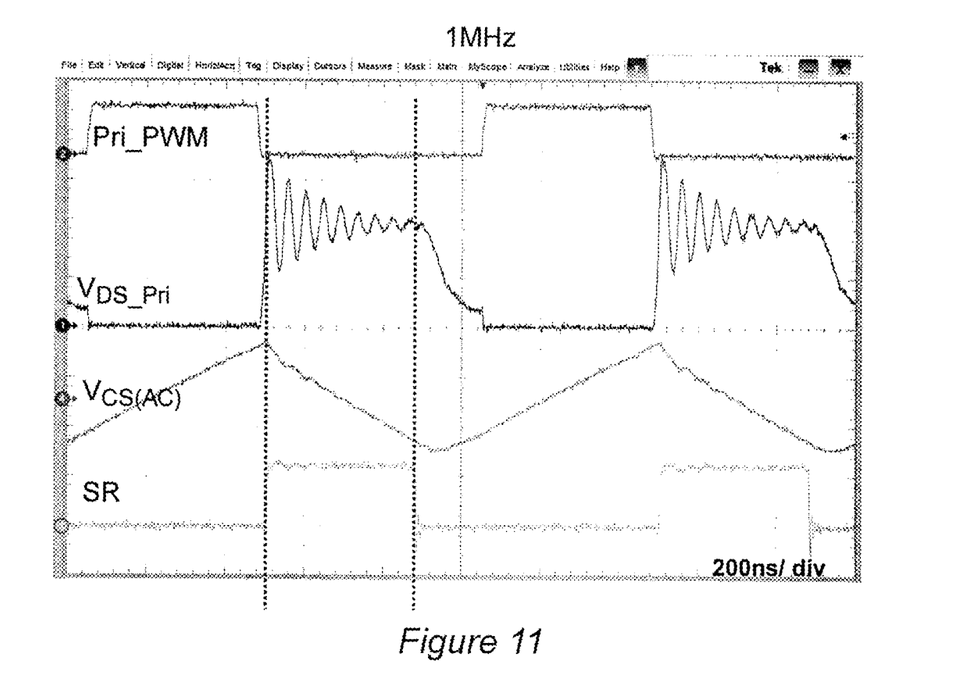
FIG. 11 illustrates experimental result waveforms of the circuit of FIG. 9A.
Figure 12:
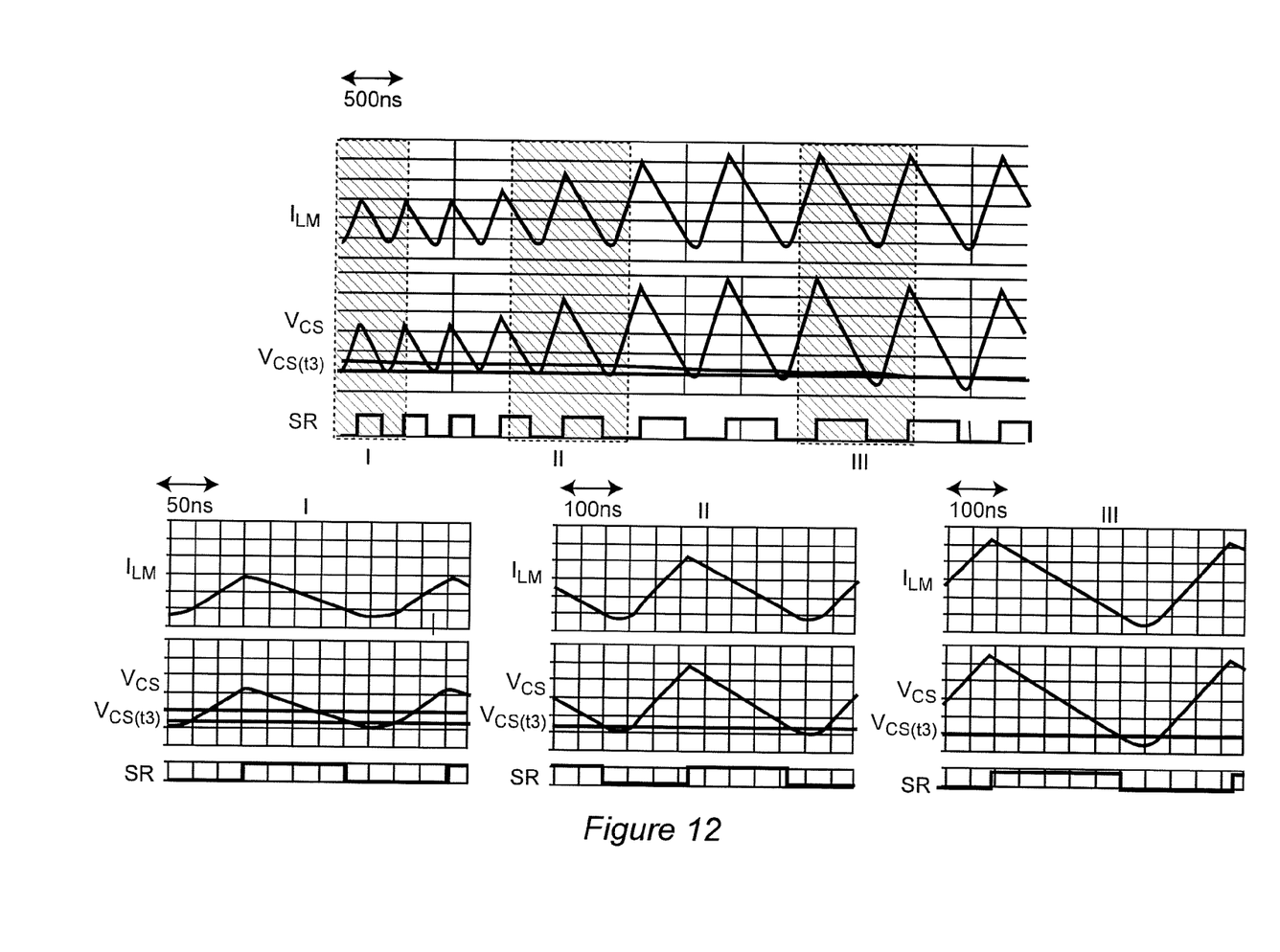
FIG. 12 illustrates results of simulation for a load step-up transient for the circuit of FIG. 9A.

Operation of the flyback power converter including the invention has been verified by experiment and the resulting waveforms shown in FIG. 11. The nearly complete immunity from ringing in the $V_{CS}$ signal is evident and no delayed turn-on or early turn-off is observed. Further, since offline-type electrical devices may be operated while receiving power from the grid, response to load transients is of importance. A step-up transient has been simulated and the results are illustrated in FIG. 12. The states are illustrated; state I being light load steady-state operation, state II being the transient response and state III being a high load steady-state operation. It can be seen that $V_{cs}$ follows changes in $I_{LM}$ in all three states and the switching points remain identical throughout the transient response and steady-state operation regardless of load and change of duty cycle of both the PWM signal and the SR control signal.

In view of the foregoing, it is clearly seen that the invention provides a simple and compact circuit that produces a waveform that is immune from high frequency oscillation and emulates the waveform of magnetizing current in the isolation transformer of a flyback converter and provides correct and stable switching points for control of a synchronous rectifier over a large load range. Therefore the invention supports operation of the transformer isolated flyback converter (and other types of transformer isolated converters where oscillatory behavior is observed) at high switching frequencies for further reduction of size and weight and assures highly efficient operation of compact power converters for offline electrical devices through proper control of synchronous rectifiers.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A transformer isolated power converter comprising
   a transformer,
   a synchronous rectifier connected in series with a secondary winding of said transformer,
   a series connected resistance and capacitance connected in parallel with said synchronous rectifier, and
   a circuit responsive to a voltage developed across said capacitor for developing a signal to control said synchronous rectifier wherein a waveform of said voltage developed across said capacitor is substantially identical in shape and phase and of a same or different amplitude as a magnetizing inductance current waveform of said transformer.

2. The transformer isolated power converter as recited in claim 1, wherein said voltage developed across said capacitor is compared to a threshold to determine switching times for said synchronous rectifier.

3. The transformer isolated power converter as recited in claim 2 wherein said threshold is set to create a dead time between a turn off time of said synchronous rectifier and a turn on time of a primary side switch.

4. The transformer isolated power converter as recited in claim 3, wherein said power converter is provided as an adapter for an offline electronic device.

5. The transformer isolated power converter as recited in claim 2, wherein said power converter is provided as an adapter for an offline electronic device.

6. The transformer isolated power converter as recited in claim 1 wherein a time constant of said series connected resistance and capacitance is approximately equal to a time constant of said secondary winding of said transformer.

7. The transformer isolated power converter as recited in claim 1, wherein said power converter is provided as an adapter for an offline electronic device.

8. The transformer isolated power converter as recited in claim 1, wherein said voltage developed across said capacitor is sampled at a predetermined time in a switching cycle to develop said signal to control said synchronous rectifier during said switching cycle.

9. A transformer isolated power converter comprising
   a transformer,
   a synchronous rectifier connected in series with a secondary winding of said transformer,
   a series connected resistance and capacitance connected in parallel with said synchronous rectifier,
   a circuit responsive to a voltage developed across said capacitor for developing a signal to control said synchronous rectifier wherein said circuit includes
   a sampling circuit for sampling said voltage across said capacitor when current is supplied to said primary winding to provide a voltage sample, and
   a bistable circuit that is set when current is supplied to said primary winding and reset when said voltage across said capacitor exceeds said voltage sample.

10. An adapter for providing power from an AC power source to an offline electrical device at a DC voltage, said adapter comprising,
    an isolation transformer having primary and secondary windings and operated at a frequency different from said AC power source,
    a synchronous rectifier in series with said secondary winding of said isolation transformer,
    a series connection including a resistor and a capacitor connected in parallel with said synchronous rectifier, and
    a logic circuit responsive to a voltage developed across said capacitor for controlling said synchronous rectifier, wherein said logic circuit includes
    a sampling circuit for sampling said voltage across said capacitor to provide a voltage sample when power is connected to said primary winding of said isolation transformer to provide a voltage sample,
    a comparator for comparing said voltage sample to an instantaneous voltage across said capacitor, and
    a bistable circuit that is set when power is connected to said primary winding and reset responsive to an output of said comparator.

11. The adapter as recited in claim 10, wherein said circuit is a logic circuit.

12. A method of driving a synchronous rectifier in a flyback power converter including an isolation transformer, said method comprising steps of
    controlling current in a primary winding of said isolation transformer,
    developing a signal having a waveform substantially identical in shape and phase and of a same or different amplitude as to a magnetizing inductance current of said isolation transformer, and
    generating a control signal near a minimum of said signal, wherein said step of generating a control signal comprises steps of sampling said voltage across said capacitor when current is supplied to said primary winding to provide a voltage sample, and setting a bistable circuit when current is supplied to said primary winding and resetting said bistable circuit when said voltage across said capacitor exceeds said voltage sample.

13. The method as recited in claim 12, further comprising a step of comparing said signal with a threshold.

14. The method as recited in claim 13, further comprising a step of setting said threshold to obtain a desired dead time between a turn off of said synchronous rectifier and applying current to said primary winding.

15. The method as recited in claim 12, wherein said step of controlling current in a primary winding is performed cyclically at a frequency of approximately one MHZ.

16. The method as recited in claim 12, wherein said step of developing a signal is performed in response to a voltage developed across a capacitor of a series connection of a resistor and said capacitor, said series connection being connected in parallel with said synchronous rectifier.

* * * * *